United States Patent
Lee

(10) Patent No.: US 8,559,484 B2
(45) Date of Patent: Oct. 15, 2013

(54) APPARATUS AND METHOD FOR COOPERATIVE RELAYING BASED ON BEAMFORMING IN A MOBILE COMMUNICATION SYSTEM

(75) Inventor: Kyung-Chun Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 912 days.

(21) Appl. No.: 12/702,876

(22) Filed: Feb. 9, 2010

(65) Prior Publication Data

US 2010/0202497 A1    Aug. 12, 2010

(30) Foreign Application Priority Data

Feb. 10, 2009    (KR) .................. 10-2009-0010462

(51) Int. Cl.
*H04B 3/36*    (2006.01)

(52) U.S. Cl.
USPC .......................................... 375/211

(58) Field of Classification Search
USPC ................. 375/211, 267, 340, 346, 347, 349; 455/7, 11, 14, 15, 272, 450, 522, 562; 370/315, 338

See application file for complete search history.

(56) References Cited

U.S. PATENT DOCUMENTS

| | | | |
|---|---|---|---|
| 8,000,744 B2 * | 8/2011 | Yoon et al. | 455/561 |
| 2003/0161384 A1 * | 8/2003 | Chun et al. | 375/130 |
| 2005/0013349 A1 * | 1/2005 | Chae et al. | 375/148 |

* cited by examiner

*Primary Examiner* — Khai Tran

(74) *Attorney, Agent, or Firm* — The Farrell Law Firm, P.C.

(57) ABSTRACT

A method and apparatus for cooperative relaying based on beamforming in a mobile communication system. In a method of cooperative relaying based on beamforming in a mobile communication system, a signal received from a transmitting terminal is decoded by a relay station to determine whether a decoding error occurs. The relay station then acquires a beamforming weight corresponding to decoding error information, if the decoding error occurs. The relay station then applies the beamforming weight to the signal received from the transmitting terminal, and transmits the signal.

18 Claims, 8 Drawing Sheets

APPARATUS AND METHOD FOR COOPERATIVE RELAYING BASED ON BEAMFORMING IN A MOBILE COMMUNICATION SYSTEM

PRIORITY

This application claims priority under 35 U.S.C. §119 to an application filed in the Korean Intellectual Property Office on Feb. 10, 2009 and assigned Serial No. 10-2009-0010462, the content of which is hereby incorporated by reference.

BACKGROUND OF THE INVENTION

1. Field of the Invention

The present invention relates generally to an apparatus and method for cooperative relaying based on beamforming in a mobile communication system, and in particular, to an apparatus and a method for performing beamforming in consideration of a decoding error of a relay station.

2. Description of the Related Art

Extensive research is being conducted on a cooperative communication scheme for improving performance of a mobile communication system. In the cooperative communication scheme, a Mobile Station (MS) and a Base Station (BS) communicate in cooperation with a plurality of Relay Stations (RSs), another MS, or other BSs, thereby improving link efficiency.

FIG. 1 is a diagram illustrating a conventional beamforming-based cooperative relay system.

Referring to FIG. 1, a BS 100 with a single antenna transmits a signal to a plurality of RSs 110 adjacent to an MS 120 and the RSs 110 operate as a virtual multiple antenna device to retransmit the signal to the MS 120. The cooperative communication scheme can achieve a multiple-antenna gain in a single-antenna environment, and can achieve a greater gain when the link condition between the BS and the MS at a cell boundary is poor.

In the cooperative communication scheme, the RSs 110 serve as a virtual signal transmission group to transmit a signal that is received from the BS 100, to the MS 120 and transmits a signal that is received from the MS 120, to the BS 100. Herein, for DownLink (DL) transmission, the RSs 110 independently decode a signal received from the BS 100, encode the decoded signal, multiply the encoded signal by a beamforming weight Wk and simultaneously retransmit the resulting signal to the MS 120. The MS 120 decodes the received beamformed signal. When the RSs 110 retransmit a signal by beamforming, higher link efficiency is achieved than where the BS 100 transmits a signal directly to the MS 120. That is, by the RSs 110 completely decoding a signal received from the BS 110 and retransmitting the decoded signal to the MS 120 without an error, higher performance is achieved.

However, if one or more of the RSs 110 fail to decode the received signal, e.g., if the RSs 110 re-encode a signal with a decoding error and transmit the re-encoded signal to the MS 120, the decoding performance of the MS 120 may degrade. In order to solve this problem, a scheme has been proposed in which the RS 110 with a decoding error re-receives the signal from the BS 100 until it succeeds in decoding the received signal. However, while this scheme enables the RS 110 to completely decode the signal, it also increases the transmission delay and the resource consumption.

SUMMARY OF THE INVENTION

The present invention has been made to address at least the above-described problems and/or disadvantages and to provide at least the advantages described below. Accordingly, an aspect of the present invention is to provide an apparatus and method for cooperative relaying based on beamforming in a mobile communication system.

An aspect of the present invention is to provide an apparatus and method for performing beamforming in consideration of a decoding error of an RS in a mobile communication system.

Another aspect of the present invention is to provide an apparatus and method for improving decoding performance of an MS in consideration of a decoding error of an RS in a mobile communication system.

In accordance with an aspect of the present invention, a method of relaying a signal based on beamforming by a relay station in a mobile communication system is provided. The method includes decoding a signal received from a transmitting terminal to determine whether a decoding error occurs; acquiring a beamforming weight corresponding to decoding error information, if the decoding error occurs; applying the beamforming weight to the signal received from the transmitting terminal; and transmitting the signal.

In accordance with another aspect of the present invention, a method for beamforming, based on relay stations, by a receiving terminal in a mobile communication system is provided. The method includes receiving decoding error information from a plurality of relay stations; determining a beamforming weight for each of the plurality of relay stations by using the decoding error information; and transmitting the determined beamforming weight to each of the relay plurality of stations.

In accordance with another aspect of the present invention, a relay station apparatus for relaying a signal based on beamforming in a mobile communication system is provided. The relay station apparatus includes a decoding error checking unit for checking whether a decoding error occurs in a signal received from a transmitting terminal; a decoding error estimating unit for estimating decoding error information, if the decoding error occurs; and a weight applying unit for acquiring a beamforming weight corresponding to the estimated decoding error and applying the beamforming weight to the signal received from the transmitting terminal.

In accordance with another aspect of the present invention, a receiving terminal apparatus for beamforming based on relay stations in a mobile communication system is provided. The receiving terminal apparatus includes a receiving unit for receiving decoding error information from a plurality of relay stations; a weight determining unit for determining a beamforming weight for each of the plurality of relay stations by using the received decoding error information; and a transmitting unit for transmitting the determined beamforming weight to each of the plurality of relay stations.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE INVENTION

Figure 1:
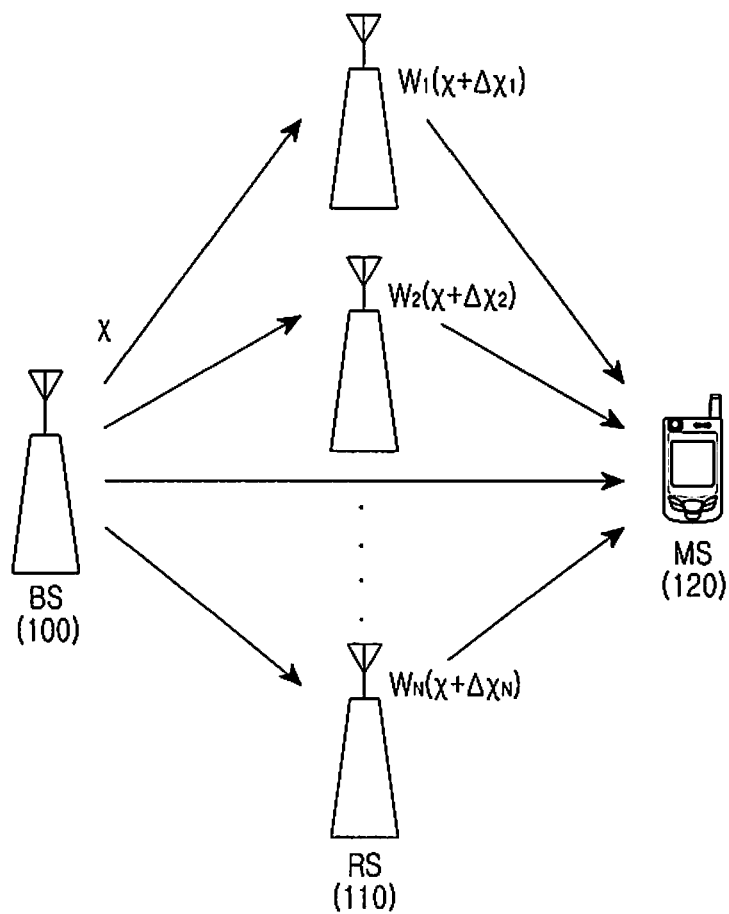
FIG. 1 is a diagram illustrating a conventional beamforming-based cooperative relay system.

Various embodiments of the present invention are described in detail herein below with reference to the accompanying drawings. In the drawings, the same or similar components may be designated by the same or similar reference numerals, although they are illustrated in different drawings. Further, detailed descriptions of constructions or processes known in the art may be omitted for clarity and conciseness in the description of the present invention.

The present invention provides apparatuses and methods for performing beamforming in consideration of a decoding error of an RS in a mobile communication system. The following description is made in terms of DownLink (DL) transmission, although the present invention is not limited thereto. More specifically, it should be clearly understood that the present invention is also applicable to UpLink (UL) transmission.

Additionally, the following description is made using an example in which a BS does not transmit a signal to an MS while RSs transmit a signal to the MS, although the present invention is not limited thereto. More specifically, it should be clearly understood that the present invention is also applicable when the BS transmits a signal to the MS while the RSs transmit a signal to the MS.

Figure 2:
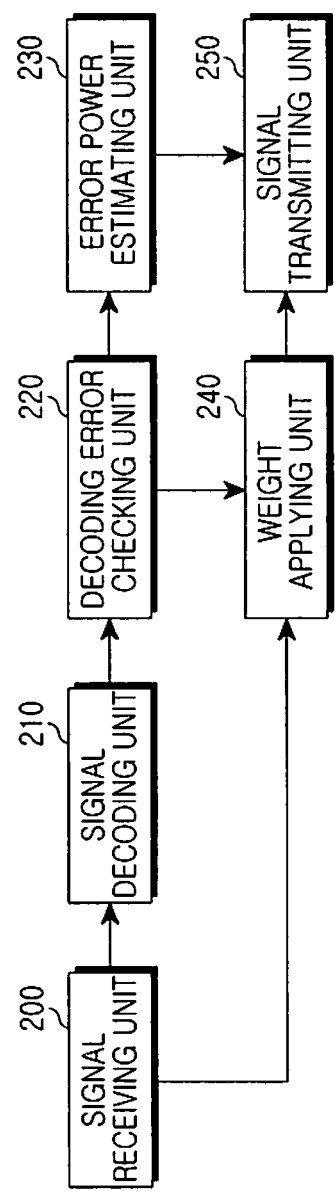
FIG. 2 is a block diagram illustrating an RS in a mobile communication system according to an embodiment of the present invention.

FIG. 2 is a block diagram illustrating an RS in a mobile communication system according to an embodiment of the present invention.

Referring to FIG. 2, the RS includes a signal receiving unit 200, a signal decoding unit 210, a decoding error checking unit 220, an error power estimating unit 230, a weight applying unit 240, and a signal transmitting unit 250.

The signal receiving unit 200 receives signals from a BS and an MS and provides the received signals to the signal decoding unit 210. The signal decoding unit 210 decodes the signals received from the signal receiving unit 200, and provides the decoded signals to the decoding error checking unit 220. According to an embodiment of the present invention, when receiving a beamforming weight from a MS, the signal receiving unit 200 provides the received beamforming weight to the weight applying unit 240.

The decoding error checking unit 220 performs a Cyclic Redundancy Check (CRC) to check whether there are any errors in the decoded received signal. If there are no errors in the decoded received signal, the decoding error checking unit 220 encodes the decoded signal and provides the encoded signal to the weight applying unit 240. If there is an error in the decoded received signal, the decoding error checking unit 220 provides the decoded signal to the error power estimating unit 230 and the weight applying unit 240.

The error power estimating unit 230 receives the signal with a decoding error from the decoding error checking unit 220, estimates the power value of the decoding error, and provides the estimated power value of the decoding error to the signal transmitting unit 250 in order to transmit the same to the MS.

The weight applying unit 240 multiplies the signal received from the decoding error checking unit 220 by a beamforming weight and provides a result to the signal transmitting unit 250. Herein, when receiving a signal without a decoding error from the decoding error checking unit 220, the weight applying unit 240 uses channel information to multiply a predetermined weight. However, when receiving a signal with a decoding error from the decoding error checking unit 220, the weight applying unit 240 multiplies the signal received from the decoding error checking unit 220 by a beamforming weight received from the MS, through the signal receiving unit 200.

The signal transmitting unit 250 transmits signals to the BS and the MS. According to an embodiment of the present invention, the signal transmitting unit 250 receives the estimated power value of the decoding error from the error power estimating unit 230 and provides the same to the MS. Also, the signal transmitting unit 250 receives a weighted signal from the weight applying unit 240 and provides the same to the MS.

Figure 3:
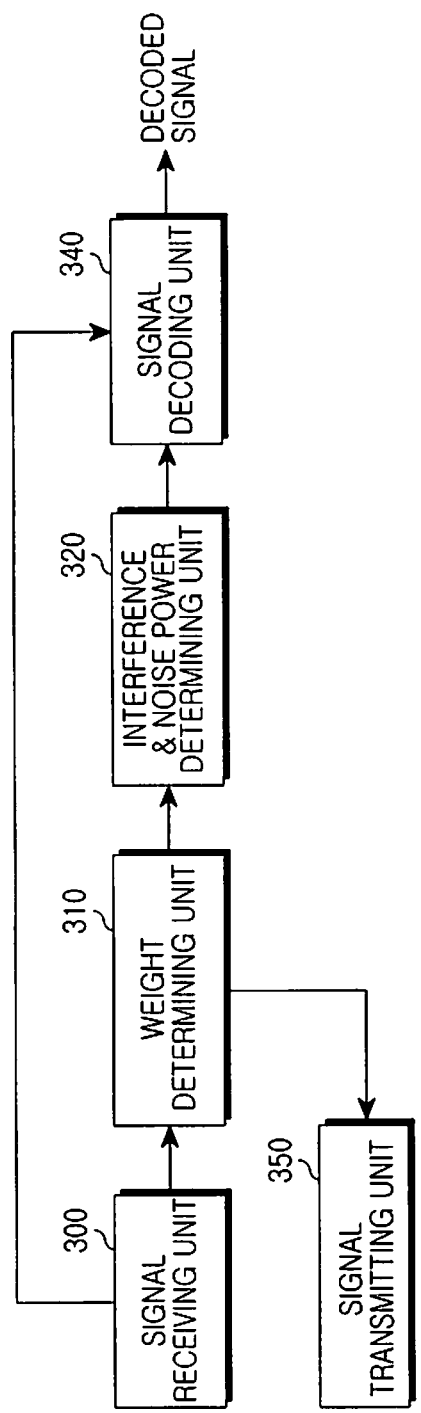
FIG. 3 is a block diagram illustrating an MS in a mobile communication system according to an embodiment of the present invention.

FIG. 3 is a block diagram illustrating an MS in a mobile communication system according to an embodiment of the present invention.

Referring to FIG. 3, the MS includes a signal receiving unit 300, a weight determining unit 310, an interference & noise power determining unit 320, a signal decoding unit 340, and a signal transmitting unit 350.

The signal receiving unit 300 receives signals from a BS and RSs and outputs the same. According to an embodiment of the present invention, when receiving a power value of a decoding error from an RS, the signal receiving unit 300 provides the power value of the decoding error to the weight determining unit 310. Also, when receiving a beamforming-based signal from the RS, the signal receiving unit 300 provides the beamforming-based signal to the signal decoding unit 340.

The weight determining unit 310 receives the average power value of a decoding error through the signal receiving unit 300 from each RS, and uses the average error power value to determine a beamforming weight of each RS. Thereafter, the weight determining unit 310 provides the determined beamforming weight of each RS to the signal transmitting unit 350 in order to transmit the same to a corresponding RS. Also, the weight determining unit 310 provides the average error power value to the interference & noise power determining unit 320.

The interference & noise power determining unit 320 determines the interference and noise power of a received signal by using the average error power value received from the weight determining unit 310, and provides the determined interference and noise power to the signal decoding unit 340.

The signal decoding unit 340 decodes the received signal from the signal receiving unit 300 in consideration of the interference and noise power received from the interference & noise power determining unit 320.

The signal transmitting unit 350 transmits signals to the BS and the RSs. According to an embodiment of the present invention, the signal transmitting unit 350 transmits the weight of each RS received from the weigh determining unit 310, to the corresponding RS.

As described above with reference to FIGS. 2 and 3, according to an embodiment of the present invention, if a decoding error occurs in one or more RSs, the RS (or RSs) with a decoding error determines the average power value of the decoding error and transmits the same to an MS. The MS determines a beamforming weight of each RS, and transmits the determined beamforming weight to a corresponding RS. Accordingly, each RS performs beamforming to transmit a signal from the BS to the MS.

A received signal of an MS can be expressed as shown in Equation (1).

$$y = h^H w x + \sum_{k=1}^{N} h_k w_k \Delta x_k + v \quad (1)$$

In Equation (1), x represents a symbol, which is to be transmitted from each RS to the MS at a specific time, $\Delta x$ represents a decoding error of the symbol x, which is caused by the decoding error of the $k^{th}$ RS, y denotes the received signal of the MS, $h_k$ denotes a channel between the $k^{th}$ RS and the MS, h denotes channels $[h_1 \ h_2 \ \ldots \ h_N]^T$ between the MS and the 'N' RSs ($[\bullet]^T$ denotes a conjugate transpose), $w_k$ denotes a beamforming weight of the $k^{th}$ RS, w denotes a total beamforming weight vector $[w_1 \ w_2 \ \ldots \ w_N]^{11}$, and v denotes a uniform noise signal with an average power of $\sigma_v^2$.

Herein, if a power value of the transmission symbol x is 1, that is, $E|x|^2=1$, the average signal power is expressed as $|h^H w|^2 = w^H R_1 W$ and $R_1$ becomes $hh^H$. Because the respective RSs perform decoding independently, if the symbols errors $[\Delta x_1 \ \Delta x_2, \ \ldots \ \Delta x_N]$ of the respective RSs are independent of each other, the average power of the interference and noise of the signal received by the MS can be expressed as shown in Equation (2).

$$E\left|\sum_{k=1}^{N} h_k w_k \Delta x_k + v\right|^2 = \sum_{k=1}^{N} |h_k|^2 |w_k|^2 E|\Delta x_k|^2 + \sigma_v^2 \quad (2)$$

In Equation (2), $E|\Delta x_\lambda|^2$ denotes a power value of the symbol error received from the $k^{th}$ RS.

Equation (2) may also be re-expressed as shown in Equation (3).

$$E\left|\sum_{k=1}^{N} h_k w_k \Delta x_k + v\right|^2 = W^H R_2 w + \sigma_v^2 \quad (3)$$

In Equation (3), $R_2$ denotes a diagonal matrix with diagonal elements of $[|h_1|^2 E|\Delta x_1|^2, \ |h_2|^2 E|\Delta x_2|^2, \ \ldots, \ |h_N|^2 E|\Delta x_N|^2]$.

Consequently, a Signal to Interference and Noise Ratio (SINR) of the signal received by the MS can be expressed as shown in Equation (4).

$$SINR = \frac{w^H R_1 w}{w^H R_2 w + \sigma_v^2} = \frac{w^H R_1 w}{w^H (R_2 + \sigma_v^2 1) w} \quad (4)$$

In Equation (4), $w^H w$ is assumed to be 1.

Herein, the MS determines a beamforming weight for maximizing the SINR of Equation (4) in order for each RS to perform beamforming for maximizing the reception SINR of the MS.

The MS determines a solution of the generalized eigenvalue problem of Equation (4) to acquire an optimal beamforming weight expressed as shown in Equation (5).

$$\hat{w} = \mathrm{argmax}_{w} \frac{w^H R_1 w}{w^H (R_2 + \sigma_v^2 1) w} \quad (5)$$

In Equation (5), $\hat{w}$ denotes a beamforming weight and a lower triangular matrix L of $(R_2 + \sigma_v^2 1) = L^H L$ may be determined by applying a Cholesky decomposition to $(R_2 + \sigma_v^2 1)$.

By defining a new vector $w_2$ as $w_2 = Lw$, Equation (5) may be re-expressed as shown in Equation (6).

$$\hat{w}_2 = \mathrm{argmax}_{w_2} \frac{w_2^H L^{-H} R_1 L^{-1} w_2}{w_2^H w_2} \quad (6)$$

Herein, if $L^{-11} R_1 L^{-1} = R_3$, Equation (6) may be re-expressed as shown in Equation (7).

$$\hat{w}_2 = \mathrm{argmax}_{w_2} \frac{w_2^H R_3 w_2}{w_2^H w_2} \quad (7)$$

Equation (7) determines a solution of an eigenvalue problem. That is, $\hat{w}_2$ becomes an eigenvector of the maximum eigenvalue of $R_3 = L^{-11} R_1 L^{-1}$.

As described above, the MS determines $\hat{w}_2$, uses a relationship of $\hat{w} = L^{-1} \hat{w}_2$ to determine a beamforming weight $\hat{w}$, and feeds back the determined beamforming weight $\hat{w}$ to the RS through a control channel or a data channel.

If the beamforming weight is $\hat{w}$, the interference and noise power of the signal received by the MS can be expressed as $\hat{w}^{11}(R_2 + \sigma_v^2 1)\hat{w}$. Therefore, the MS uses the average power value $[E|\Delta x_1|^2 \ E|\Delta x_2|^2 \ \ldots \ E|\Delta x_N|^2]$ of the decoding error to determine the diagonal matrix $R_2$ to determine the interference and noise power of the received signal.

Figure 4:
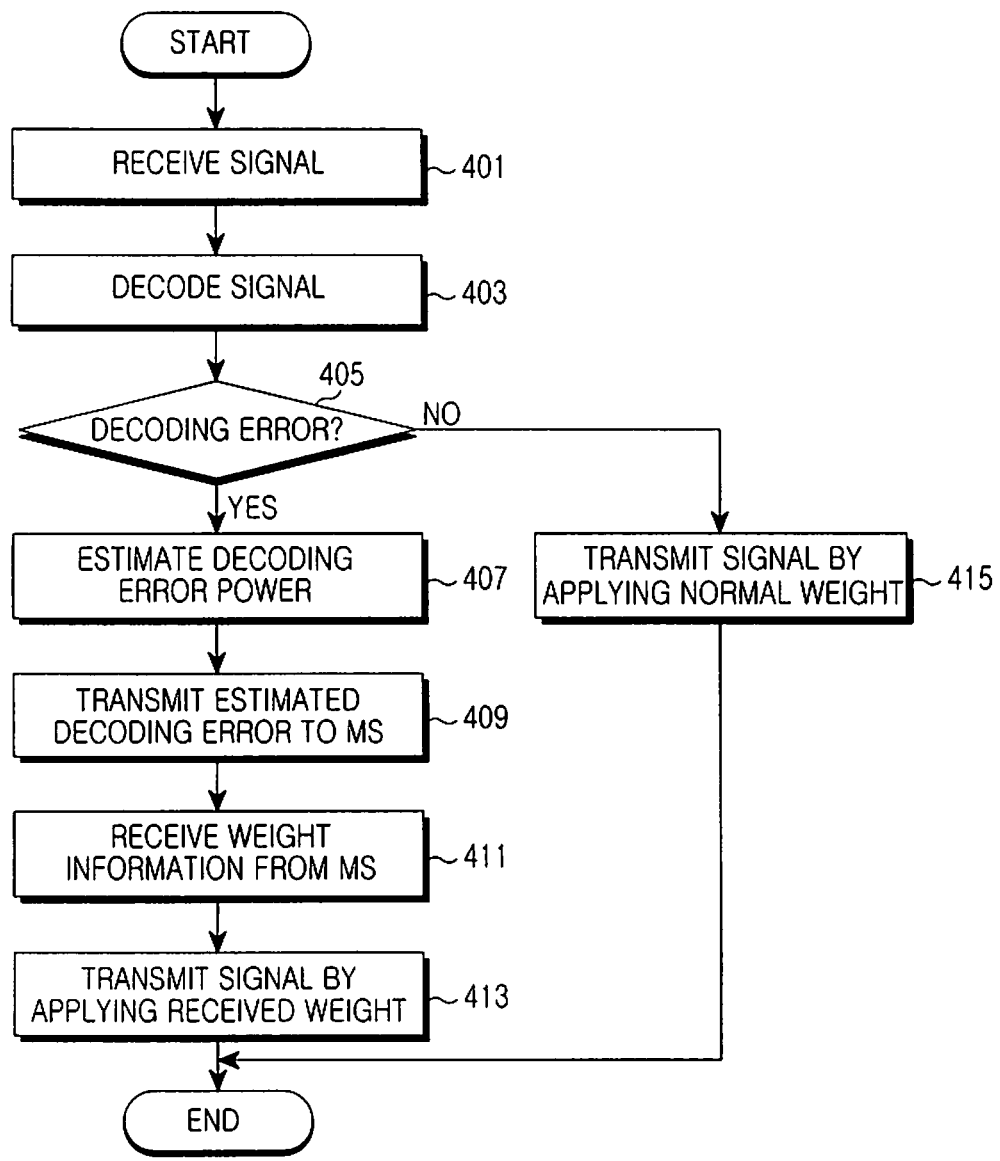
FIG. 4 is a flow chart illustrating an operation of an RS in a mobile communication system according to an embodiment of the present invention.

FIG. 4 is a flow chart illustrating an operation of an RS in a mobile communication system according to an embodiment of the present invention.

Referring to FIG. 4, the RS receives a signal from a BS in step 401. In step 403, the RS decodes the received signal. In step 405, the RS performs a CRC operation to determine whether there is an error in the decoded signal. If there is no error in the decoded signal, in step 415, the RS applies a beamforming weight based on channel information to the signal and then transmits the signal. However, if there is an error in the decoded signal, in step 407, the RS estimates the power of a decoding error caused by the decoding error.

The MS may perform a CRC operation on a Log Likelihood Ratio (LLR), which is acquired through the decoded signal, to determine the probability of the decoded signal having an error. It can be converted into the error probability distribution of the symbol acquired through re-encoding, thus making it possible to determine the power value $E|\Delta x_k|^2$ of a symbol error. For example, assuming that the probability of bits determined through the LLR in the system based on BPSK modulation is P(b=0) and P(b=1), and P(b=0)>P(b=1), the signal decoding unit 210 makes a decoding determination as $\hat{b}=0$. However, because P(b=0) is not 0, there is a decoding error. If a symbol x corresponding to b=0 in the BPSK modulation is 0 and a symbol x corresponding to b-1 is −1, the probabilities of the respective symbols are P(x=1)=P(b=0)

and P(x=−1)=P(b=1). Because P(b=0)>P(b=1), then P(x=1)>P(x=−1) and $\hat{x}$=1. Accordingly, the error power value of each symbol may be determined as $$E|\Delta x|^2 = \sum_{x \in \{-1,1\}} |\hat{x} - \tilde{x}|^2 P(\tilde{x}).$$

In step 409, the RS transmits the estimated power value of the decoding error to the MS: In step 411, the RS receives weight information, which is based on the decoding error, from the MS. In step 413, the RS applies the weight to the received signal to perform beamforming, thereby transmitting the received signal from the BS to the MS.

Figure 5:
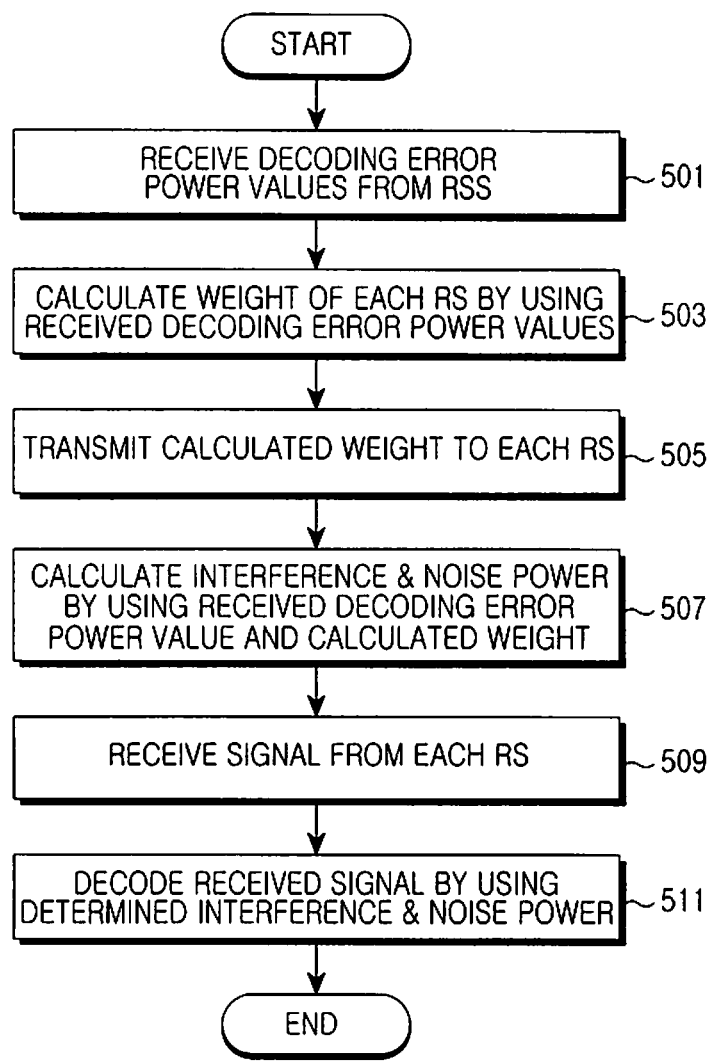
FIG. 5 is a flow chart illustrating an operation of an MS in a mobile communication system according to an embodiment of the present invention.

FIG. 5 is a flow chart illustrating an operation of an MS in a mobile communication system according to an embodiment of the present invention.

Referring to FIG. 5, the MS receives decoding error power values from RSs in step 501. In step 503, the MS uses the received decoding error power values to determine the weight of each RS. That is, the MS determines the weight for maximizing the SINR of the MS as shown in Equation (4) above, which may be determined using Equation (5).

In step 505, the MS transmits the determined weight of each RS to the corresponding RS. In step 507, the MS uses the received decoding error power value and the weight to determine the interference and noise power of a received signal. That is, the MS determines the interference and noise power by using the average of the decoding error power value received from each RS, i.e., the average power value of the decoding error and the determined weight.

In step 509, the MS receives a signal, to which the weight transmitted by the MS is applied, from each RS. In step 511, the MS uses the determined interference and noise power to decode the received signal.

Figure 6:
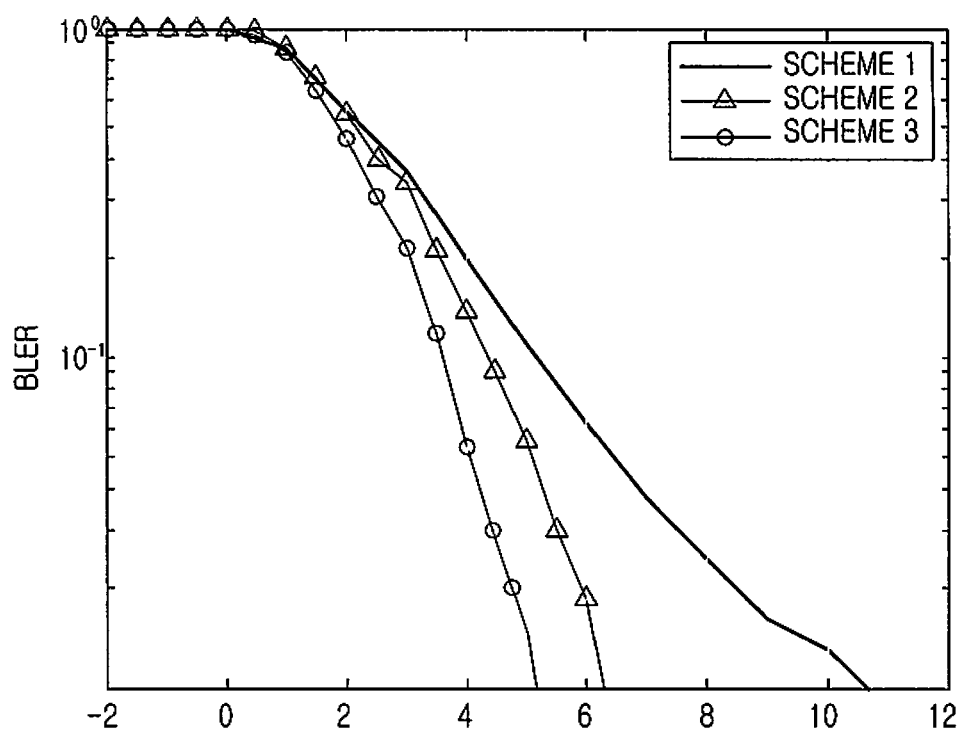
FIG. 6 is a graph illustrating beamforming-based performances in accordance with embodiments of the present invention versus beamforming-based performance using a conventional method in a mobile communication system.

FIG. 6 is a graph illustrating beamforming-based performances according to embodiments of the present invention versus a conventional method in a mobile communication system. Herein, it is assumed that a BS, an RS and an MS have a single antenna, 4 RSs are used, an average Signal to Noise Ratio (SNR) of the channel between the BS and the RS is equal to the average SNR of the channel between the RS and the MS, and the SNR from the BS to the MS is 6 dB lower than the SNR of the channel between the BS and the RS and between the RS and the MS. Herein, a turbo codeword of a length 1024 of a length 1/2 data rate and a QPSK modulation are used, the horizontal axis represents the SNR of the channel between the RS and the MS, and the vertical axis represents a Block Error Rate (BLER).

Referring to FIG. 6, scheme 1 represents performance of a conventional method, wherein a decoding error in an RS is not considered and only channel information is used to apply a beamforming weight. Scheme 2 represents performance according to an embodiment of the present invention, wherein each RS notifies the power value of a decoding error to an MS, the MS uses the power value of the decoding error to determine the interference and noise power, and decodes a signal on the basis of the determined interference and noise power. Scheme 3 represents performance according to an embodiment of the present invention, wherein the MS determines a beamforming weight of each RS in consideration of the decoding error of each RS in addition to the scheme 2 and each RS performs beamforming based on the beamforming weight determined by the MS.

It can be seen from FIG. 6 that the schemes 2 and 3 according to the embodiments of the present invention have a lower BLER than the conventional scheme 1.

Figure 7:
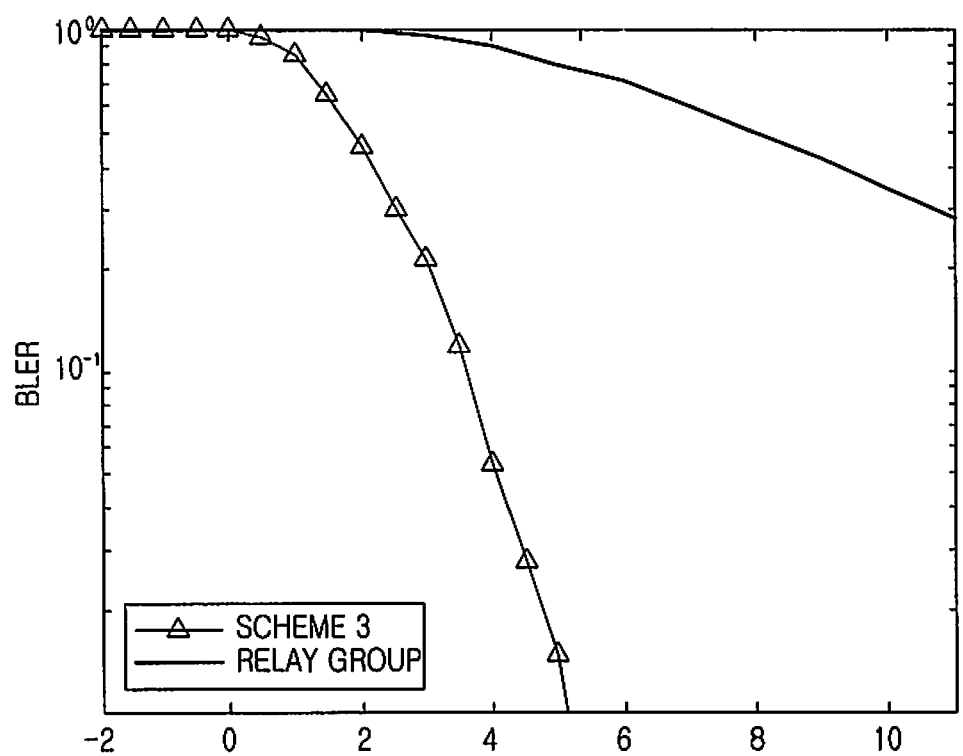
FIG. 7 is a graph illustrating decoding errors of an RS and an MS in a mobile communication system according to an embodiment of the present invention.

FIG. 7 is a graph illustrating decoding errors of an RS and an MS in a mobile communication system according to an embodiment of the present invention. Herein, the assumed experimental environment is identical to that described above for FIG. 6, and the horizontal axis represents the SNR of the channel between the RS and the MS, and the vertical axis represents a BLER.

In FIG. 7, a relay group represents the decoding error level when a plurality of RSs receives a signal from a BS and decode the signal, and scheme 3 represents the decoding error level of a received signal of the MS according to an embodiment of the present invention as described with reference to FIG. 6.

Referring to FIG. 7, scheme 3 according to an embodiment of the present invention has a lower BLER than the relay group, and the decoding error tendency of the relay group is used to analyze the transmission delay levels of the conventional scheme 1 and scheme 3 according to an embodiment of the present invention. For the conventional scheme, if a decoding error occurs in an RS, a retransmission from a BS occurs, the retransmission probability increases with an increase in the decoding error, and the transmission delay increases due to the frequent retransmission requests. However, for scheme 3, an MS, not an RS, determines the need for retransmission and the decoding error of the RS is considered for requesting a retransmission with a low probability. Thus, scheme 3 according to an embodiment of the present invention has a lower retransmission probability than the conventional scheme and decreases a transmission delay caused by a retransmission, thus making it possible increase the data capacity transmissible in a limited resource environment.

Although the descriptions above have specifically illustrated RSs as performing the relay function, other idle MSs in a cell may also serve as the RS.

Also, although it has been described above that the MS receives a decoding error from each RS to determine a beamforming weight, the beamforming weight may also be determined by the RS. For example, the RS receives channel information about the corresponding MS and a decoding error from other RSs to determine a beamforming weight, and transmits the determined beamforming weight value to the other RSs. Herein, the RS may receive the channel information between the corresponding MS and the other RSs from the other RSs or the corresponding MS.

Figure 8:
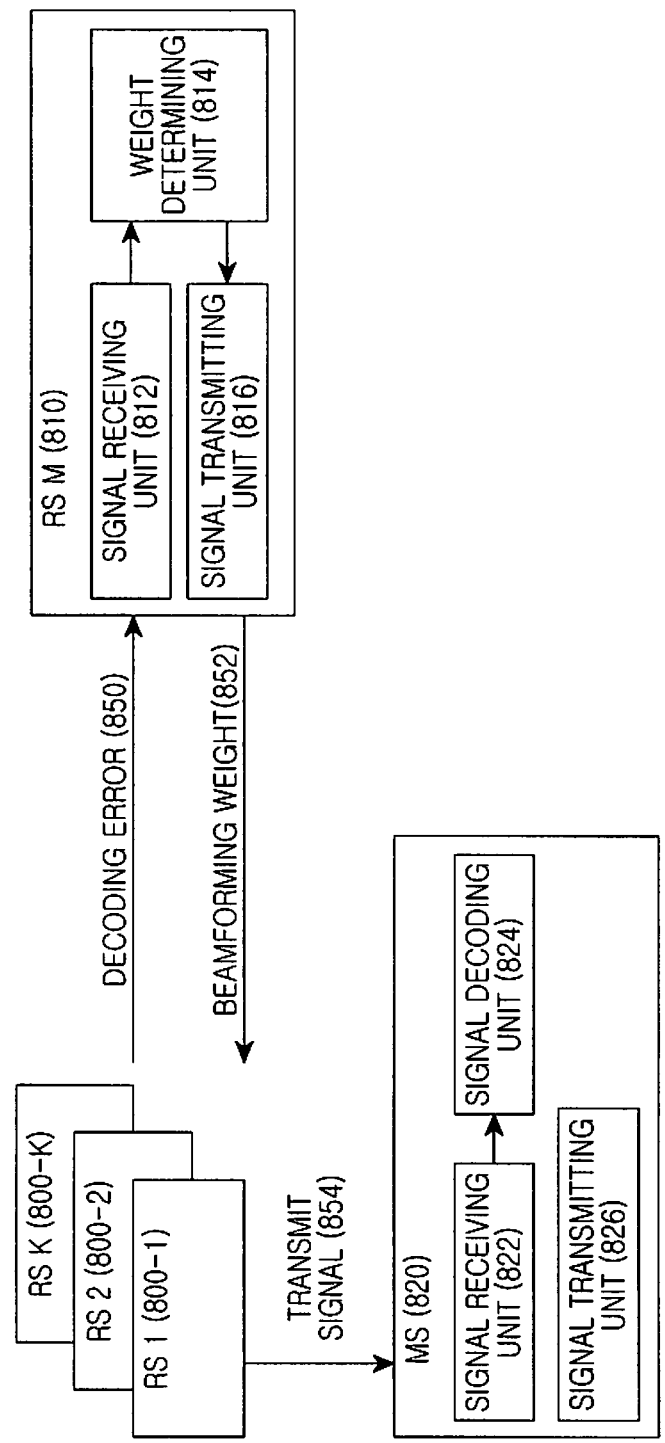
FIG. 8 is a diagram illustrating an RS determining a beamforming weight in a mobile communication system according to an embodiment of the present invention.

FIG. 8 is a diagram illustrating an RS determining a beamforming weight in a mobile communication system according to an embodiment of the present invention. Because a plurality of RSs 800-1 to 800-k are configured in the same manner as described with reference to FIG. 2, a detailed description thereof will be omitted for conciseness.

Referring to FIG. 8, each of RSs 800-1 to 800-k decodes a signal received from a BS. If there is a decoding error, each RS estimates the power value of a decoding error and transmits the determined power value of the decoding error to a RS M 810 (see step 850). Herein, for example, each of the RSs 800-1 to 800-k may receive channel information from the corresponding MS 820 and transmit the same to the RS M 810. Thereafter, each of the RSs 800-1 to 800-k receives a beamforming weight from the RS M 810 (in step 852). Each of the RSs 800-1 to 800-k multiplies the received signal by the beamforming weight and transmits the result to a MS 820 (see step 854).

The RS M 810 includes a signal transmitting unit 812, a weight determining unit 814, and a signal transmitting unit 816. The RS M 810 receives a decoding error from each of the RSs 800-1 to 800-k to determine a beamforming weight of each RS as shown above in Equation (5), and transmits the same to each of the RSs 800-1 to 800-k. That is, the RS M 810 uses the signal receiving unit 812 to receive the average power values of the decoding errors and the channel information of the corresponding MS, uses the weight determining unit 814 to determine a beamforming weight of each RS. Thereafter, the RS M 810 uses the signal transmitting unit 816 to transmit the beamforming weight of each RS to the corresponding RS (see step 852).

The MS 820 includes a signal receiving unit 822, a signal decoding unit 824, and a signal transmitting unit 826. The MS 820 decodes a beamforming-based signal received from the BS, and transmits the channel information about the RSs 800-1 to 800-k to the RSs 800-1 to 800-k or the RS M 810. Herein, for example, the MS 820 receives the average error power value from the RSs 800-1 to 800-k or the RS M 810 to determine the interference and noise power of a received signal, and decodes the received signal in consideration of the determined interference and noise power.

Although the above description has been made on the assumption that the RSs 800-1 to 800-k and the RS M 810 are configured in a separate manner, the RS M 810 may relay a signal between the BS and the MS like the RSs 800-1 to 800-k. That is, the function of the RS M 810 may be performed in one of the RSs 800-1 to 800-k.

Although the embodiments of the present invention have been described above using devices having a single antenna, the present invention is also applicable to BSs, RSs and MSs using multiple antennas.

As described above, the present invention performs beamforming in the mobile communication system in consideration of the decoding error of the RS, thereby making is possible to improve the decoding performance of the MS, reduce unnecessary retransmissions between the BS and the RS, and provide a high transmission efficiency to the MSs that are located at the cell boundary and have a low signal reception power from the BS.

While the present invention has been shown and described with reference to certain embodiments thereof, it will be understood by those skilled in the art that various changes in form and details may be made therein without departing from the spirit and scope of the present invention as defined by the appended claims. Therefore, the scope of the invention is defined not by the detailed description of the invention but by the appended claims, and all differences within the scope will be construed as being included in the present invention.

What is claimed is:

1. A method of a relaying a signal based on beamforming by a relay station in a mobile communication system, the method comprising:
    decoding a signal received from a transmitting terminal;
    determining whether there is an error in the decoded signal;
    acquiring a beamforming weight corresponding to decoding error information, if the there is an error in the decoded signal;
    applying the beamforming weight to the signal received from the transmitting terminal; and
    transmitting, to a receiving terminal, the signal to which the beamforming weight is applied.

2. The method of claim 1, wherein acquiring the beamforming weight comprises:
    transmitting the decoding error information to another relay station or the receiving terminal; and
    receiving the beamforming weight from the another relay station or the receiving terminal.

3. The method of claim 1, wherein acquiring the beamforming weight comprises:
    receiving decoding error power values and channel information about the receiving terminal from a plurality of other relay stations;
    acquiring a decoding error power value of the relay station and channel information about the receiving terminal;
    using the decoding error power values and the channel information to determine a beamforming weight for each of the relay stations; and
    transmitting the determined beamforming weights to each corresponding relay station.

4. The method of claim 3, wherein the beamforming weight for each of the relay stations has a value for maximizing a Signal to Interference and Noise Ratio (SINR) of a signal received by the receiving terminal.

5. The method of claim 1, further comprising applying a beamforming weight based on channel information of the receiving terminal, to the signal received from the transmitting terminal, if there is no error in the decoded signal.

6. A method of determining beamforming weights by a receiving terminal in a mobile communication system, the method comprising:
    receiving decoding error information from a plurality of relay stations;
    determining beamforming weights for each of the plurality of relay stations by using the decoding error information; and
    transmitting the determined beamforming weights to each of the plurality of relay stations.

7. The method of claim 6, wherein determining the beamforming weight comprises:
    acquiring channel information about each of the plurality of relay stations; and
    determining the beamforming weights for each of the plurality of relay stations by using the channel information and decoding error power values received from the plurality of relay stations.

8. The method of claim 6, wherein the beamforming weights for each of the plurality of relay stations have a value for maximizing a Signal to Interference and Noise Ratio (SINR) of a signal received by the receiving terminal.

9. The method of claim 6, further comprising;
    determining at least one of interference and noise powers of a received signal by using the received decoding error information and the beamforming weight;
    receiving a signal with the beamforming weights from the plurality of relay stations; and
    decoding the received signal by using at least one of the determined interference and noise powers.

10. A relay station for relaying a signal based on beamforming in a mobile communication system, the apparatus comprising:
    a receiving unit for receiving signal from a transmitting terminal;
    a decoding error checking unit for checking whether a decoding error occurs in a signal received from a transmitting terminal;
    a decoding error estimating unit for estimating decoding error information, if the decoding error occurs;
    a weight applying unit for acquiring a beamforming weight corresponding to the estimated decoding error and applying the beamforming weight to the signal received from the transmitting terminal; and
    a transmitting unit for transmitting, to a receiving terminal, the signal to which the beamforming weight is applied.

11. The apparatus of claim 10, wherein the transmitting unit transmits the decoding error information to another relay station or the receiving terminal; and wherein the receiving unit receives the beamforming weight from the another relay station or the receiving terminal.

12. The apparatus of claim 10, further comprising:

a receiving unit for receiving decoding error power values and channel information about the receiving terminal from a plurality of other relay stations;

a weight determining unit for acquiring the decoding error power value of the relay station and channel information about the receiving terminal and using the decoding error power values and the channel information to determine beamforming weights for each of the plurality of other relay stations; and a transmitting unit for transmitting the determined beamforming weights to the relay stations.

13. The apparatus of claim 12, wherein the beamforming weights for each of the plurality of other relay stations have a value for maximizing a Signal to Interference and Noise Ratio (SINR) of a signal received by the receiving terminal.

14. The apparatus of claim 10, wherein the weight applying unit applies a beamforming weight, which is based on channel information of the receiving terminal, to the signal received from the transmitting terminal, if the decoding error does not occur.

15. A receiving terminal apparatus determining beamforming weights for relay stations in a mobile communication system, the apparatus comprising:

a receiving unit for receiving decoding error information from a plurality of relay stations;

a weight determining unit for determining beamforming weights for each of the plurality of relay stations by using the received decoding error information; and a transmitting unit for transmitting the determined beamforming weights to each of the plurality of relay stations.

16. The apparatus of claim 15, wherein the weight determining unit determines the beamforming weights for each of the plurality of relay stations by using channel information about each of the plurality of relay stations and decoding error power values received from the plurality of relay stations.

17. The apparatus of claim 15, wherein the beamforming weights for each of the plurality of relay stations have a value for maximizing a Signal to Interference and Noise Ratio (SINR) of a signal received by the receiving terminal.

18. The apparatus of claim 15, wherein the receiving unit receives a signal with the beamforming weights from the relay stations, and wherein the receiving unit receives comprises:

a interference and noise power determining unit for determining at least one of interference and noise powers of a received signal by using the received decoding error information and the beamforming weights; and a decoding unit for decoding the received signal by using at least one of the determined interference and noise powers.

* * * * *